US006322368B1

(12) United States Patent
Young et al.

(10) Patent No.: US 6,322,368 B1
(45) Date of Patent: Nov. 27, 2001

(54) TRAINING AND TESTING HUMAN JUDGMENT OF ADVERTISING MATERIALS

(75) Inventors: Charles E. Young; Paul E. Young, both of Albuquerque, NM (US); Christopher C. Young, Seattle, WA (US)

(73) Assignee: CY Research, Inc., Albuquerque, NM (US)

( * ) Notice: Subject to any disclaimer, the term of this patent is extended or adjusted under 35 U.S.C. 154(b) by 0 days.

(21) Appl. No.: 09/358,379

(22) Filed: Jul. 21, 1999

Related U.S. Application Data

(60) Provisional application No. 60/093,564, filed on Jul. 21, 1998.

(51) Int. Cl.[7] ....... G09B 5/06

(52) U.S. Cl. ....... 434/236; 434/219

(58) Field of Search ....... 434/236, 350, 434/238, 322, 323; 705/10

(56) References Cited

U.S. PATENT DOCUMENTS

| | | | | |
|---|---|---|---|---|
| 3,748,750 | * | 7/1973 | Viemeister | 434/236 |
| 4,358,277 | * | 11/1982 | Moyes et al. | 434/322 |
| 4,870,579 | * | 9/1989 | Hey | 364/419 |
| 4,958,284 | * | 9/1990 | Bishop et al. | 364/419 |
| 5,034,807 | | 7/1991 | Von Kohorn . | |
| 5,041,972 | * | 8/1991 | Frost | 364/401 |
| 5,227,874 | | 7/1993 | Von Kohorn . | |
| 5,243,517 | | 9/1993 | Schmidt et al. . | |
| 5,508,731 | | 4/1996 | Kohorn . | |
| 5,551,880 | * | 9/1996 | Bonnstetter et al. | 434/236 |
| 5,618,179 | | 4/1997 | Copperman et al. . | |
| 5,823,879 | | 10/1998 | Goldberg et al. . | |
| 5,916,024 | | 6/1999 | Von Kohorn . | |
| 5,978,648 | * | 11/1999 | George et al. | 434/362 |
| 5,991,595 | * | 11/1999 | Romona et al. | 434/353 |

* cited by examiner

*Primary Examiner*—Joe H. Cheng
*Assistant Examiner*—Kathleen M. Christman
(74) *Attorney, Agent, or Firm*—Jeffrey D. Myers; Deborah A. Peacock

(57) ABSTRACT

An apparatus and method for training and testing human judgement concerning one or more complex human activities. Computer storage and access of a plurality of audio/visual presentations and corresponding measures of performance is provided, the presentations are played back and users are required to rank the audio/visual presentations. User rankings are compared against the corresponding measures of performance, and scores are tabulated for one or more users.

12 Claims, 7 Drawing Sheets

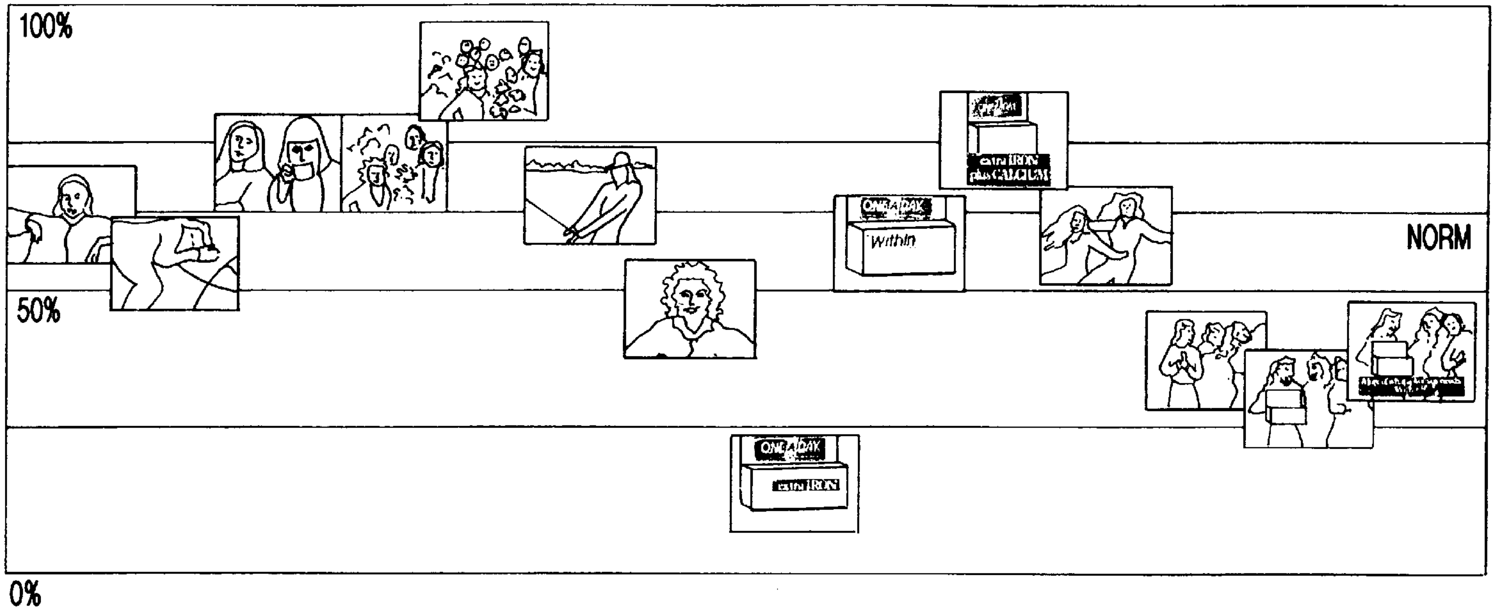

ABOUT THE METHOD

The flow of Attention shows the results of selective perception in action. Even in a forced viewing situation only about 2/3 of the images in an average TV commercial break through the "clutter of the mind" to penetrate viewer consciousness. The height of each picture shown represents the percentage of respondents remembering each frame during the copytest. the patterns shown in this kind of flow graph are highly predictive of recall and persuasion.

ABOUT THE COMMERCIAL

This add was developed to introduce a new vitamin. The Flow has the characteristic "two-humped" shape of a successful problem-solution format. The first peak occurs where the problem is being established using government data and visually shows that few women get enough calcium in their diets. The second peak occurs where the solution to that problem is presented: new Within vitamins with extra iron+calcium.

KEYS TO GOOD RECALL SCORES

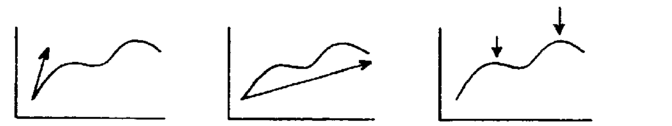

FIG-4a

TRAINING AND TESTING HUMAN JUDGMENT OF ADVERTISING MATERIALS

CROSS-REFERENCE TO RELATED APPLICATIONS

This application claims the benefit of the filing of U.S. Provisional Patent Application Ser. No. 60/093,564, entitled Method for Training and Testing Human Judgement, filed on Jul. 21, 1998, and the specification thereof is incorporated herein by reference.

COPYRIGHT MATERIAL

A portion of the disclosure of this patent document, and/or of the provisional patent application referred to above, contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention (Technical Field)

The present invention relates to methods and devices for training and testing human judgement.

2. Background Art

Complex decision-making tasks are performed routinely by human beings. Training is often useful in developing skills in such tasks, and testing is useful in analyzing development of such abilities. For example, simulators for motor vehicles, aircraft, and spacecraft have been essential in providing training and testing for very important behaviors.

A generalized audio/visual device for performing training in a variety of different areas has heretofore been unknown. Training had to be done by specific purpose machines, such as automobile simulators, chess problem devices, and the like. The present invention presents a method and apparatus that has more general applications than heretofore known.

SUMMARY OF THE INVENTION (DISCLOSURE OF THE INVENTION)

The present invention is of an apparatus and method for training and testing human judgement concerning one or more complex human activities comprising: storing and accessing by computer a plurality of audio/visual presentations and corresponding measures of performance; playing back the audio/visual presentations; requiring users to rank the audio/visual presentations; comparing user rankings against the corresponding measures of performance; and tabulating scores of comparisons for one or more users. In the preferred embodiment, storing and accessing is of a plurality of audio/visual presentations such as motion picture advertisements, still picture advertisements, world wide web home pages or advertisements, audio advertisements, audio clips or previews, or motion picture clips or previews, and of measures of performance such as survey measures of audience response. For still and video presentations, playing back is best done in side-by-side displays. Measures of performance are preferably expert rankings, sales levels, survey measures of audience response, Flow of Attention measures, or Flow of Emotion measures. Presentations are preferably randomly presented. Supplemental information may be supplied to users, such as diagnostic information, Flow of Attention information, Flow of Emotion information, or theoretical information.

A primary object of the present invention is to provide a device and method for computerized training and testing of human judgement.

A primary advantage of the present invention is that it is generalizable across a wide spectrum of human activities.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
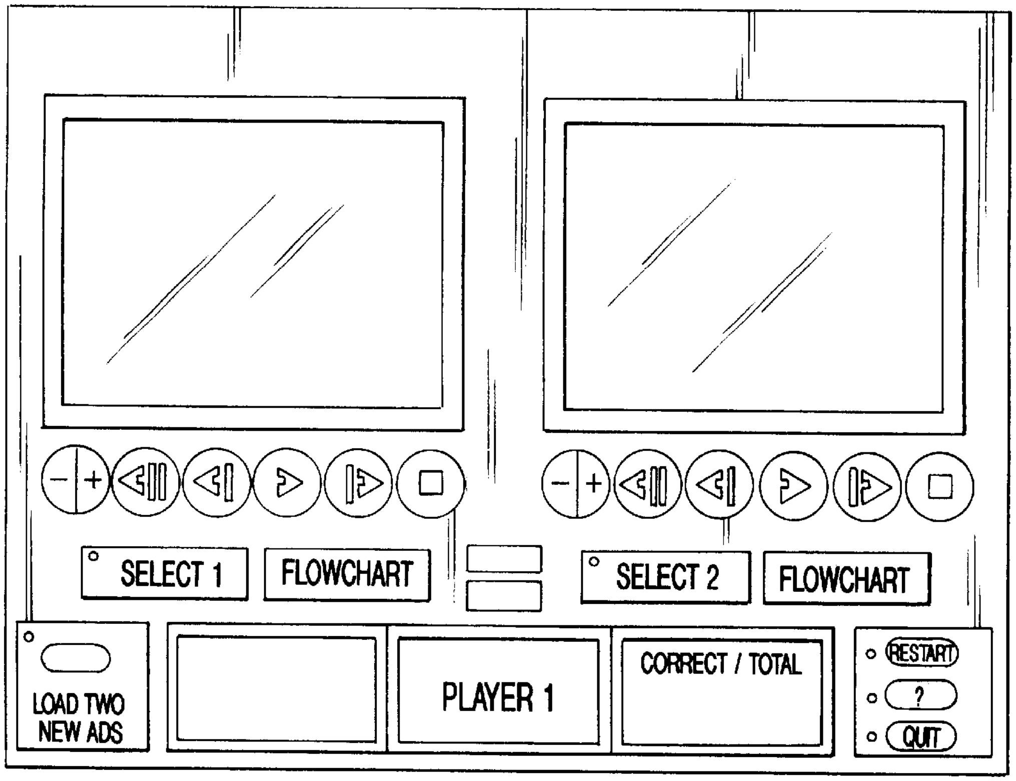
FIG. 1 is a front view of an embodiment of the invention especially useful in training of judgement regarding advertising.

DESCRIPTION OF THE PREFERRED EMBODIMENTS (BEST MODES FOR CARRYING OUT THE INVENTION)

The present invention is of an apparatus and method for computerized training and testing of human judgement by simulating decisions about the performance of complex human activities and comparing the decisions made by the user to actual measures of performance. The invention includes software to be run in conjunction with a database of performance measures. The software preferably takes the form of a game that can be played by one or more players either by itself or embedded in a more general training session in which the implicit models underlying player predictions are elicited in discussion and refined.

The objects which the players of the game are asked to make judgements about are multimedia presentations of human activities or productions that have previously been evaluated and which represent a range of differing levels of success or effectiveness. This can include videos of artistic or athletic performances that have been rated by judges, popular music recordings, television commercials, or other forms of advertising, new product concepts, virtual representations of store layouts or designs, business case histories, and other examples of complex human activities or productions to which some external quantitative measure of performance can be attached and which can be used to validate or invalidate the decisions made by the players.

The types of measures of performance used by the software include ratings made by expert judges, sales levels, survey measures of audience response, research measures such as recall, likeability, purchase intent or persuasiveness, or any other quantitative measure which users in the category recognize as a valid criteria for effective performance and which can be assigned in a well-defined way to each multimedia presentation contained in the database. Preferably, measures preserve the property of ordinality so that if object A is ranked as a better performance than B and B is ranked as a better performance than C, then A is ranked as a better performance than C.

The program preferably selects the multimedia presentations from the database two or three at a time. The presentations are selected according to a random search algorithm. There are two kinds of constraints preferably imposed on the search. The first is that the presentations be matched on key criteria that "level the playing field" for the decision making—for example, in the case of television commercials, the commercials might be matched so that pairs are all of the same length or degree of finish. The second is that performance measures be different by at least some predetermined minimum quantity. This quantity reflects the degree of difficulty selected by the player, with smaller differences representing more difficult judgements.

To enhance various levels of play, supplemental information can be provided to the players. This can take the form of diagnostic information, i.e., other measures that are related to but not identical with the performance measure, or theoretical information about general principles operating in the category.

The score generated by the game of the invention is preferably the number of correct predictions made divided by the total number of decisions made. By selecting a fixed number of decisions for a game, a winner can be defined. The score generated by the game can be thought of as a performance measure itself, namely of the accuracy of the player's judgement in predicting historically validated results. As such, the game can be used as a test of judgement in addition to being an interactive tool for training purposes.

Industrial Applicability

The invention is further illustrated by the following non-limiting example.

EXAMPLE 1

Figure 2:
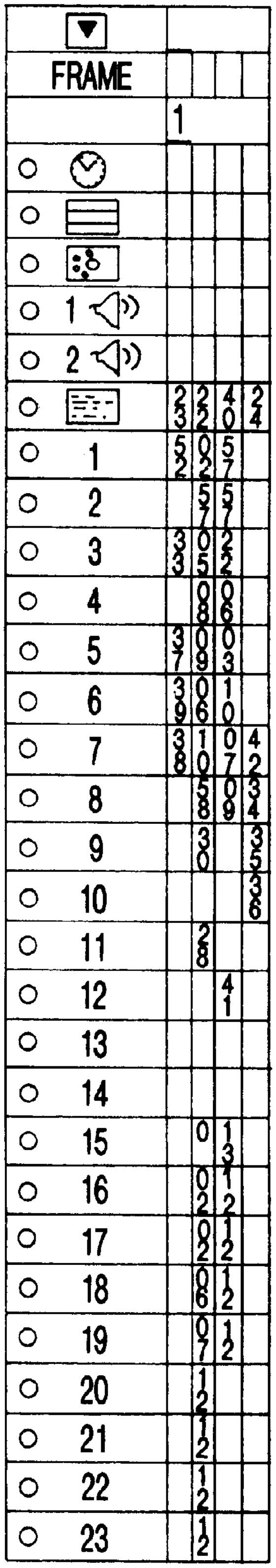
FIG. 2 illustrates data structures useful in the device of FIG. 1.
Figure 3:
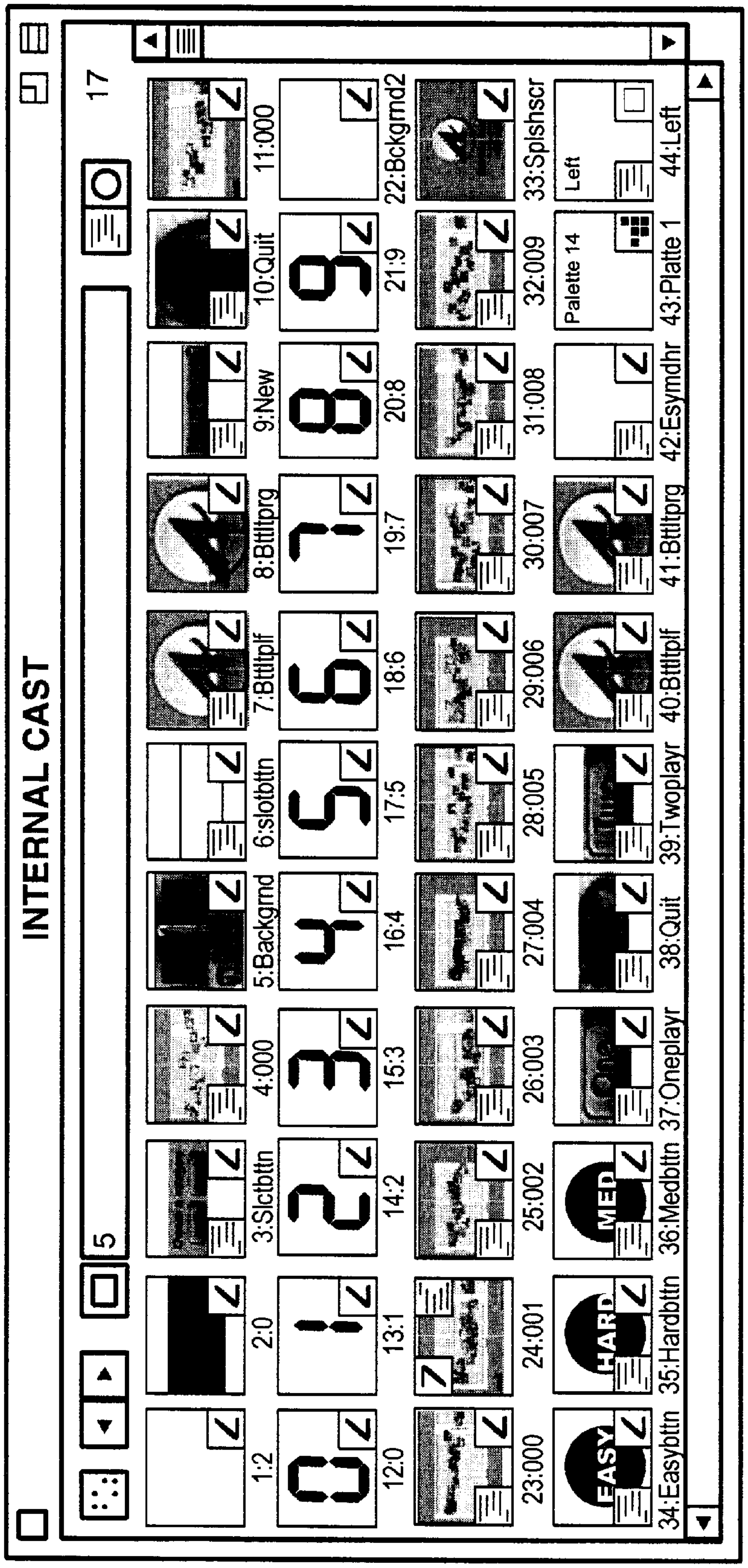
FIG. 3 shows icons that appear or can be activated in the device of FIG. 1.

The prototype software disclosed in the provisional patent application first cited above is designed to teach advertising managers how to identify television commercials which will be more effective at attracting the attention of target consumer audiences. The devices and data structures developed on an Apple Macintosh personal computer are illustrated in FIGS. 1–3. Fifty television commercials were digitized and stored on a CD-ROM along with their Attention Scores collected from consumer research. The game was designed to be played by one or two players (or teams of players), and could be played on three levels of difficulty.

Figure 5:
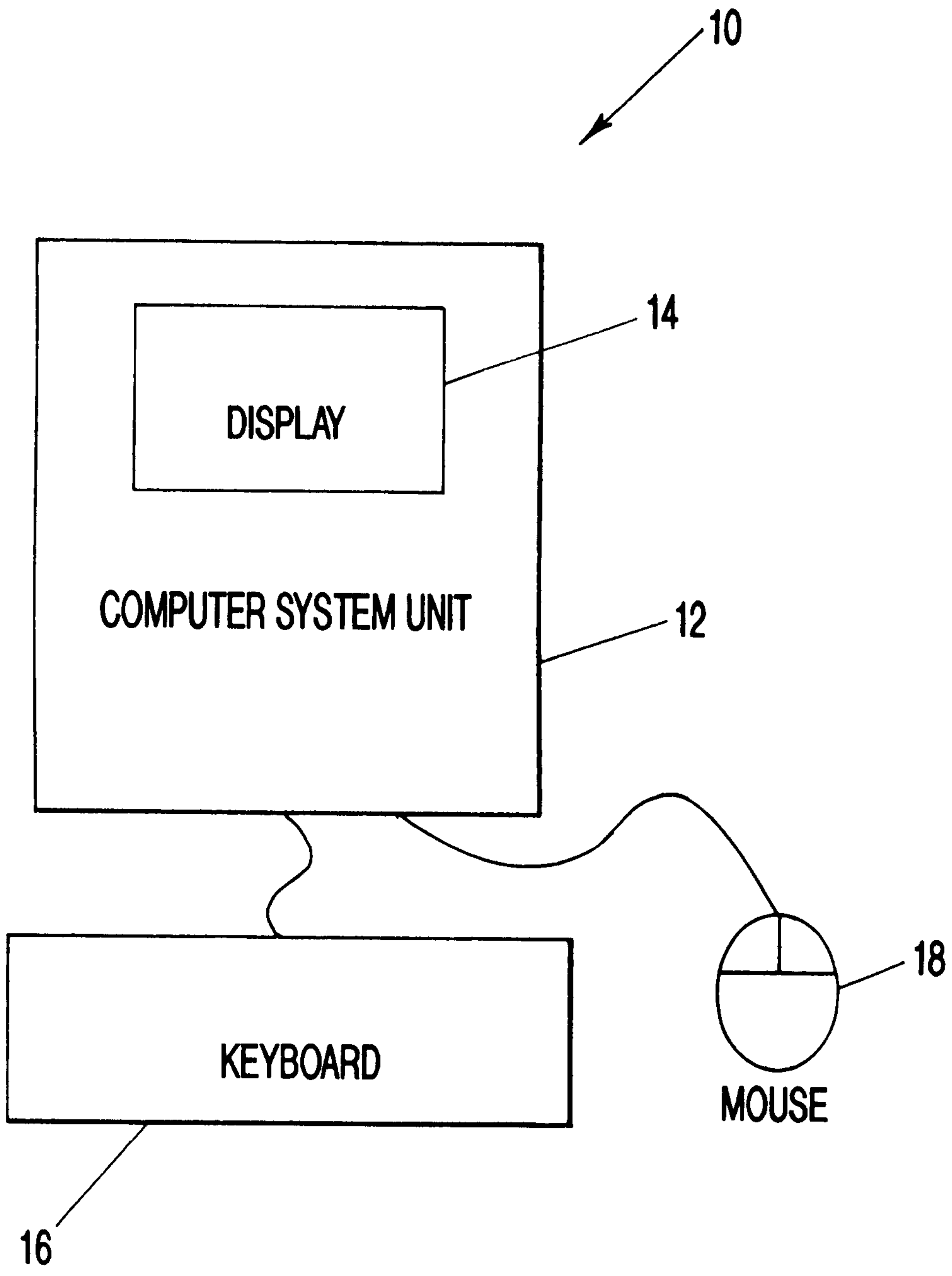
FIG. 5 is a block diagram of the apparatus of the invention.
Figure 6:
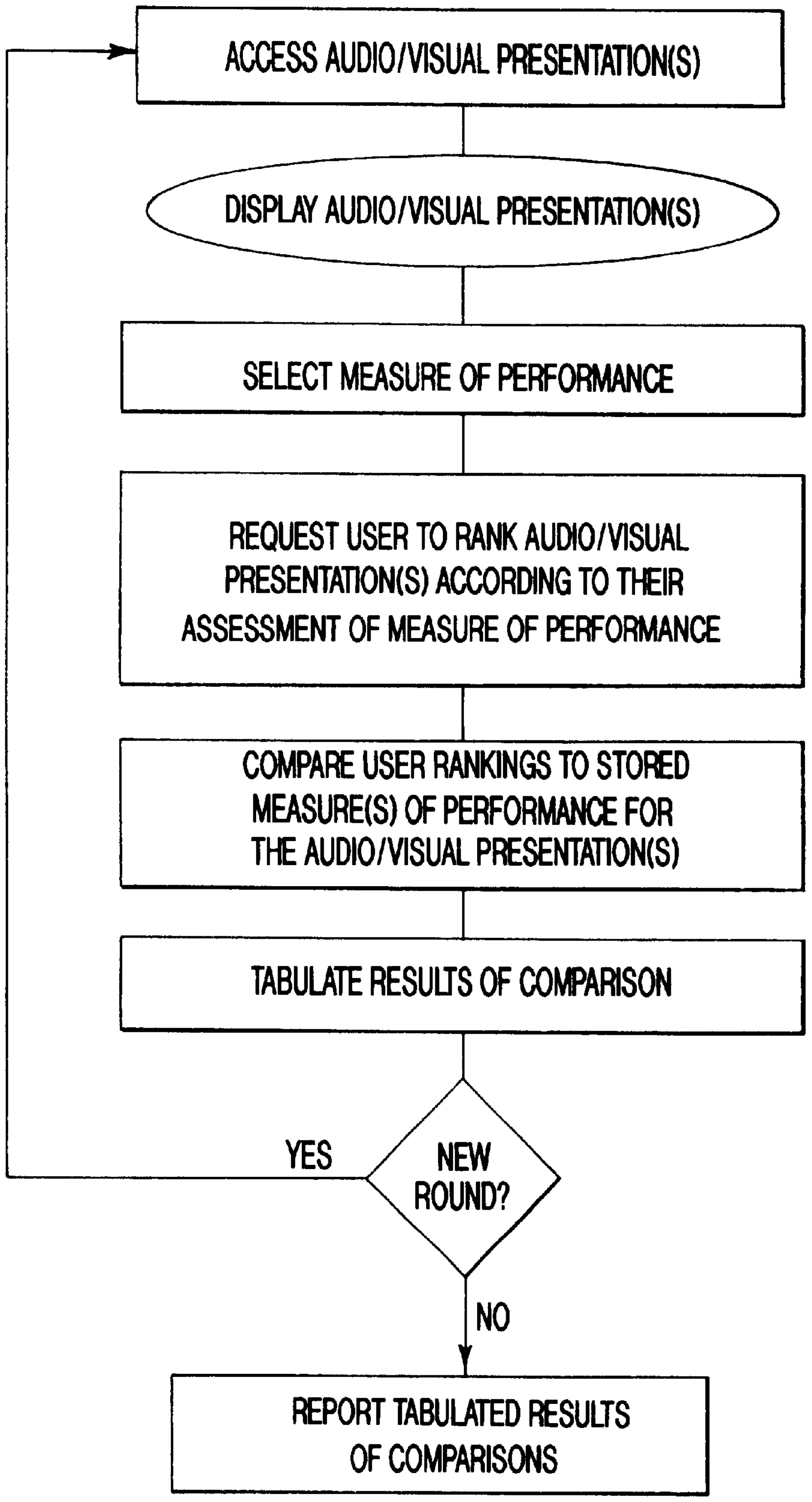
FIG. 6 is a flowchart of the method of the invention.

FIG. 5 illustrates and apparatus 10 according to the invention comprising computer system unit 12, display 14, keyboard 15, and mouse 18. The player console of FIG. 1 appears on display 14 and is interacted with via keyboard 16 and mouse 18. Of course, the software of the invention executes on system unit 12. FIG. 6 is a flow chart of the primary method of the invention for a single user, the double-user method simply employing the steps of the flow chart once for each user per round.

Figure 4B:
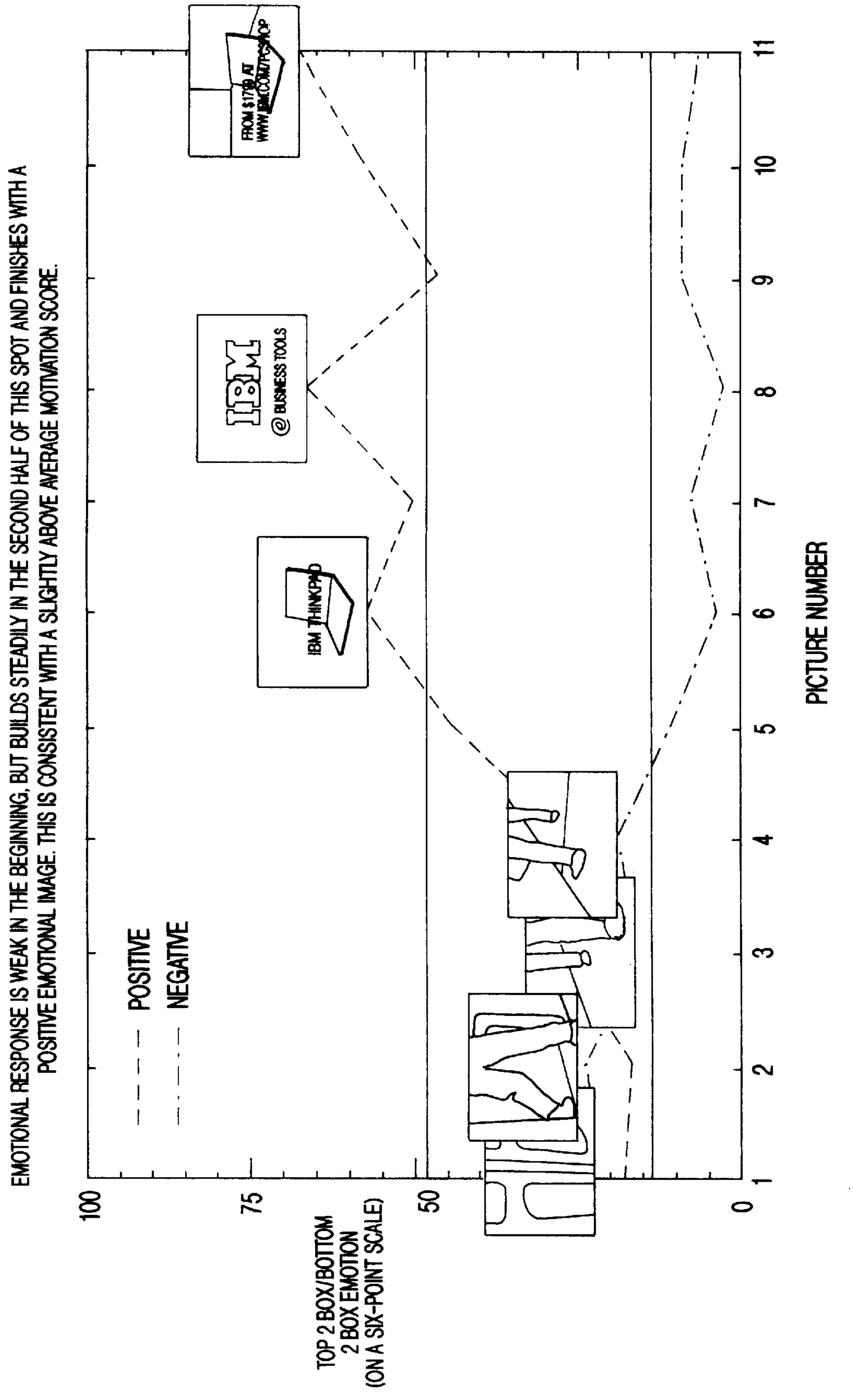
FIG. 4 illustrates a preferred display of Flow of Attention or Flow of Emotion information.

Flow of Attention or Flow of Emotion information can also be used to rank the commercials or be provided as a diagnostic feature to aid the judgement of the players. This information is gathered by selecting images from the commercial and determining audience response to each selected image. For Flow of Attention information, audience recall is determined. For Flow of Emotion information, strength of emotional response is determined. This type of information can be usefully displayed (see FIG. 4) to a player of the invention by displaying a graph embedding the selected images at a Y-axis position according to Flow of Attention or Flow of Emotion score and an X-axis position corresponding to time position within the commercial.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for training and testing human judgement concerning assessment of advertising, said apparatus comprising:

computer means for storing and accessing a plurality of audio/visual advertising presentations and corresponding survey measures of audience response;

means for playback of said audio/visual presentations;

means for one or more users to rank said audio/visual presentations;

means for comparing user rankings against said corresponding survey measure of audience performance;

means for tabulating scores of comparisons for one or more users; and wherein said storing and accessing means comprises means for storing and accessing a plurality of audio/visual advertising presentations selected from the group consisting of motion picture advertisements, still picture advertisements, world wide web home pages or advertisements, audio advertisements, audio clips or previews, and motion picture clips or previews.

2. The apparatus of claim 1 wherein said playback means comprises side-by-side displays.

3. The apparatus of claim 1 wherein said storing and accessing means further comprises means for storing and accessing measures of performance selected from the group consisting of expert rankings, sales levels, Flow of Attention, and Flow of Emotion.

4. The apparatus of claim 1 wherein said storing and accessing means comprises means for randomly accessing two or more audio/visual presentations for said playback means to present to a user for a comparison ranking.

5. The apparatus of claim 1 additionally comprising means for storing, accessing, and playback of supplemental information concerning said plurality of audio/visual presentations.

6. The apparatus of claim 5 wherein said means for storing, accessing, and playback of supplemental information comprises means for storing, accessing, and playback of supplemental information selected from the group consisting of diagnostic information, Flow of Attention information, Flow of Emotion information, and theoretical information.

7. A method for training and testing human judgement concerning assessment of advertising, the method comprising the steps of:

a) storing and accessing by computer a plurality of audio/visual advertising presentations and corresponding survey measures of audience response;

b) playing back the audio/visual presentations;

c) requiring users to rank the audio/visual presentations;

d) comparing user rankings against the corresponding survey measure of audience performance;

e) tabulating scores of comparisons for one or more users; and wherein storing and accessing comprises storing and accessing a plurality of audio/visual advertising presentations selected from the group consisting of motion picture advertisements, still picture advertisements, world wide web home pages or advertisements, audio advertisements, audio clips or previews, and motion picture clips or previews.

8. The method of claim 7 wherein playing back comprises playing back in side-by-side displays.

9. The method of claim 7 wherein storing and accessing further comprises storing and accessing measures of performance selected from the group consisting of expert rankings, sales levels, Flow of Attention measures, and Flow of Emotion measures.

10. The method of claim 7 wherein storing and accessing comprises randomly accessing two or more audio/visual presentations to present to a user for a comparison ranking.

11. The method of claim 7 additionally comprising the steps of storing, accessing, and playing back supplemental information concerning the plurality of audio/visual presentations.

12. The method of claim 11 wherein storing, accessing, and playing back supplemental information comprises storing, accessing, and playing back supplemental information selected from the group consisting of diagnostic information, Flow of Attention information, Flow of Emotion information, and theoretical information.

* * * * *